3,027,320
REMOVING SALT FROM SEA WATER
Ben B. Buchanan, Bartlesville, Okla., assignor to Phillips Petroleum Company, a corporation of Delaware
Filed Sept. 14, 1959, Ser. No. 839,671
13 Claims. (Cl. 210—59)

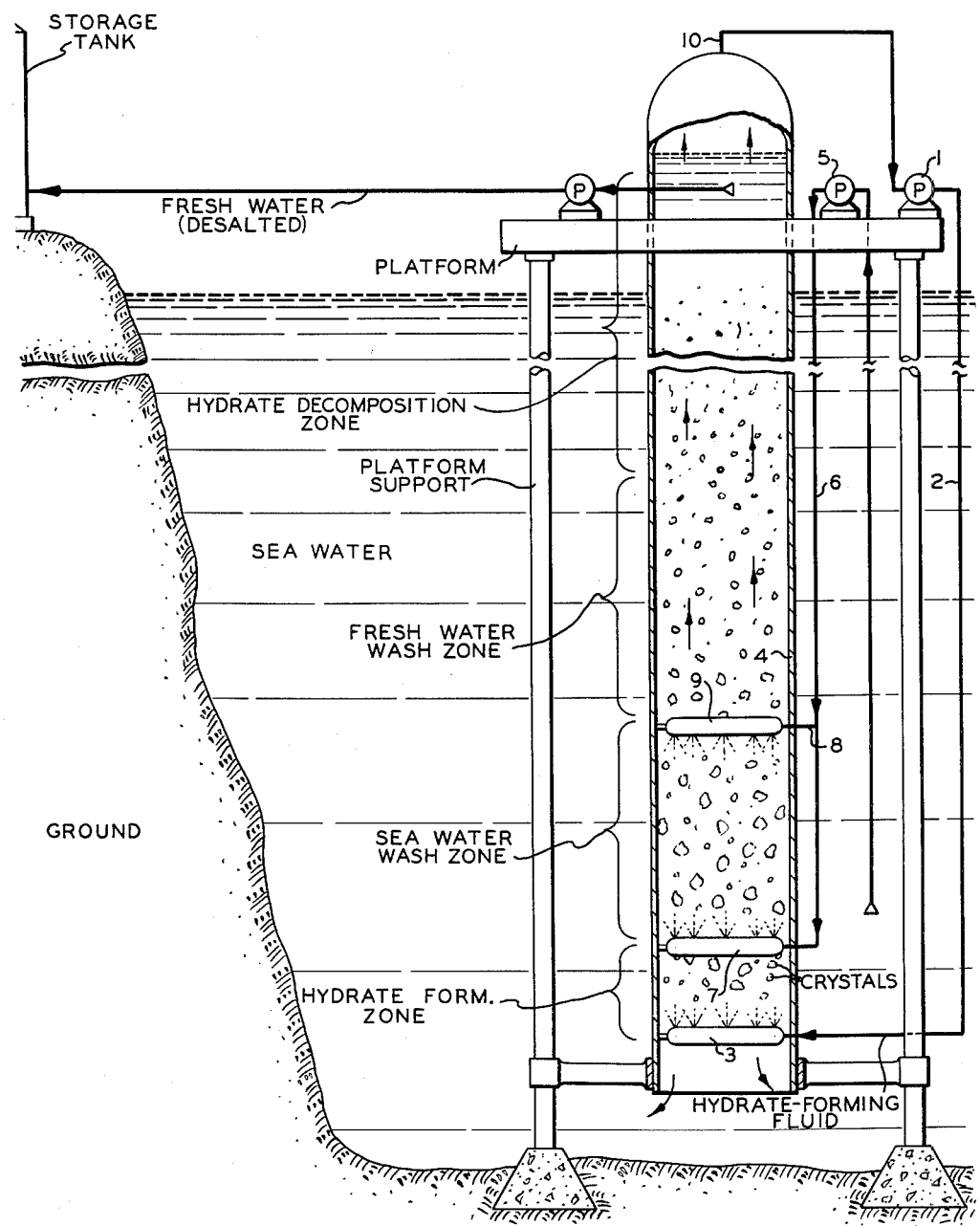

This invention relates to removing salt from sea water. In one of its aspects, it relates to the formation of hydrates, for example, hydrocarbon hydrates, with sea water at a level substantially below the surface of the sea by pumping a hydrate-forming material as herein described, but preferably a hydrocarbon such as propane, to said level and freeing the same in a confined zone through which the hydrate thus formed, being lighter than sea water, will float upwardly, gradually melting and forming a layer of substantially salt-free water which can be recovered. In another of its aspects, the invention relates to apparatus essentially comprising a pipe extending downwardly from the level of the sea, closed at its upper end and open at its lower end, the said pipe being supplied with pumps, compressors and auxiliary piping wherewith to introduce light hydrocarbon or other hydrate former to a bottom portion of said pipe, introduce sea water wash into said pipe above the introduction of the hydrocarbon, etc.

One of the most desired inventions now needed by man is one which renders economically feasible the recovery of substantially desalted water from sea water.

I have now conceived a method and an apparatus in which advantage is taken of the favorable conditions for the formation and decomposition of hydrates at certain levels in the sea below the surface thereof. This is done by providing a downwardly-extending fairly large diameter pipe which in one embodiment is open at its bottom end to discharge water therefrom and closed at its upper end to collect water from which salt has been removed and which results from the melting of hydrates which have risen due to their lower density to said end of said pipe.

An object of this invention is to provide a method for desalting sea water. Another object of this invention is to provide an apparatus for desalting sea water. A further object of the invention is to provide a method for the desalting of sea water, taking advantage of the formation of certain hydrates with sea water using liquid and/or gaseous hydrate-forming materials. A still further object of the invention is to provide an apparatus with which to form and to recover and to decompose hydrocarbon and other hydrates of sea water.

Other aspects, objects and the several advantages of this invention are apparent from the disclosure, the drawing and the appended claims.

According to the invention, there is provided a method for removing salt from sea water which comprises confining a column of sea water as within a pipe closed at its upper end and open at its lower end, passing a light hydrocarbon gas or liquid, or other hydrate-forming material, into said pipe near its lower end, thus forming hydrates of sea water, allowing the lower density hydrates to rise in said pipe and to melt at an upper, warmer and lower pressure level therein forming water from which salt has been removed and collecting said water from which salt has been removed from an upper portion of said pipe. Further, according to the invention, there is provided a method which comprises pumping a sea water wash down into a lower portion of the pipe but to a point in the pipe which is above the point at which the hydrates are formed, thus to wash the hydrates. Other steps and features of the method according to the invention are apparent from this disclosure, the drawing, and the appended claims.

Still further according to the invention, there is provided an apparatus comprising essentially a downwardly extending vessel or pipe closed at its upper end and adapted to be substantially immersed in the sea, a compressor for taking suction at the top end of the pipe on hydrate-forming material accumulating therein and for pumping said material down to a lower end of said pipe, and a pump for pumping sea water wash down to a lower end of said pipe but to a point above the point to which the material is pumped and also for pumping sea water into said pipe at a point substantially below the point to which the sea water wash is pumped.

In its simplest form, the invention is operative in a specific embodiment by allowing sea water and propane to form a hydrate which rises up through a pipe lowered to a suitable depth in the ocean. The hydrate melts on its way up, producing fresher water. Finally, fresh water is moving essentially downwardly in the pipe and hydrates are moving upwardly, thus establishing a counter-current washing of the hydrate crystals. This allows a fresh water and hydrocarbon take-off to be made at the top of the pipe. The hydrocarbon can be recycled.

The cost of forming ice from sea water, and thus to purify sea water by eliminating salt therefrom, is fairly high as is well known. According to this invention, the quantity of refrigeration required to form hydrates is much lower and is largely supplied by the inexhaustible volumes of cool sea water. Propane hydrate crystals, for example, are formed from sea water containing 5 percent salt at 40° F. and 80 pounds per square inch gauge. The hydrate crystal contains 1 mol of propane to 17 mols of water. Advantage is also taken of the fact that as the pressure decreases, as the crystal rises upward through the pipe, the melting or freezing point of the hydrate crystal decreases. Propane hydrate crystals melt at 33° F. at 15 pounds per square inch gauge. The reduction in pressure alone is thus sufficient to melt the crystals as they rise upward in the pipe.

According to the present invention, sea water can be purified by lowering a pipe into the ocean to a depth of approximately 200 feet. The bottom end pressure would be about 85 pounds per square inch gauge. Location for water temperatures of 35° F. at a depth of 200 feet can readily be found. These conditions favor the formation propane hydrate crystals.

If desired, the pipe can be provided with baffles which will increase the time taken for the hydrate to rise through the pipe to regions of lower pressure and higher temperature and, therefore, to be melted. Once the top section of the pipe is filled with water of increased purity, this water can thereafter serve to wash the ascending crystals free of occluded salt water. Baffles can be provided to cause intimate contacting of the ascending crystals and descending fresh water. This improves washing efficiency.

It will be noted that the only energy required in any substantial amount is that for recycling of the hydrocarbon.

Referring now to the drawing, hydrocarbon is pumped by pump 1 through pipe 2 and sparger ring 3 into the bottom portion of relatively large diameter pipe 4. Simultaneously, pump 5, which may be a submerged pump located near the bottom of pipe 4, pumps sea water by way of pipe 6 and sparger ring 7 into the pipe 4 in the vicinity of the entering hydrocarbon. Conditions of pressure and temperature are such that hydrate crystals are formed. Hydrate crystals which are lighter in density than sea water tend to float upwardly and, in so doing, are washed countercurrent fashion, first with sea water entering pipe 4 by way of pipe 8 and sparger ring 9 to remove the reject concentrated salt water. Continuing to rise, the washed hydrate crystals are further washed in zone B by desalted water accumulated in the hydrate decomposition zone indicated generally at A. By adjusting flow rates into and out from pipe 4, it is possible to accomplish a net downward movement of desalted water from zone A, which is the hydrate decomposition zone, through zone B, which is the fresh water washing zone, through zone C, which is the sea water wash zone, and finally through zone D, which is the hydrate formation zone. As the hydrate decomposes, the hydrocarbon gas is released and is taken off at the top of pipe 4 by way of pipe 10 and can be returned by way of pump 1 and pipe 2 for reuse. The compressed hydrocarbon gas is condensed in pipe 2 by heat exchange with cool sea water. The heat of formation of the hydrate crystals is rapidly dissipated into the large volume of cool sea water surrounding pipe 4.

The hydrocarbon gases which can be used include those having 1–4 carbon atoms and mixtures thereof.

Conditions of temperature and pressure required for hydrate formation differ somewhat according to the hydrocarbon employed. Thus, methane forms hydrate crystals at a temperature of 50° F. and a pressure 1100 p.s.i.a. Ethane requires a temperature of 55° F. and a pressure of 400 p.s.i.a. Propane forms hydrates at 40° F. and 65 p.s.i.a. Normal butane requires a temperature of 32° F. at a pressure of only 17 p.s.i.a. A mixture of the above hydrocarbons would require intermediate conditions. A mixture of n-butane and propane will form hydrates at a temperature of 35° F. and a pressure of 20 p.s.i.a.

Any desired mixture of hydrate-forming materials and/or hydrocarbons can be used.

The following specific embodiment illustrates a preferred mode of operation.

A 10-foot diameter, 200-foot-long pipe extends from the surface of the sea downward to a level where the temperature is 35° F. and the pressure 80 p.s.i.g. The pipe is closed at the top except for separate conduits for removing propane gas and fresh water. Propane is pumped to the bottom of the pipe at the rate of 2,000 gallons per hour and discharged into the interior of the pipe through a sparge ring. Sea water, containing 30,000 p.p.m. salt, is pumped into the bottom of the pipe at a point just above the propane sparge ring at the rate of 20,000 gallons per hour. Hydrate crystals form at the rate of 95,000 pounds per hour and move upward through the sea water wash zone in which the reject salt water, containing 60,000 p.p.m. salt, is washed from the crystals with fresh sea water containing 30,000 p.p.m. salt. The fresh sea water is pumped into the top of the sea water wash zone at the rate of 5,000 gallons per hour. The hydrate crystals continue their upward movement through the fresh water wash zone where the occluded sea water is largely displaced with fresh water by the countercurrent washing action. The crystals finally enter an upper level where the higher temperature of the sea surrounding the pipe, 40° F., and the decreased pressure within the pipe, 20 p.s.i.g., cause decomposition of the crystals with the liberation of fresh water and gaseous propane. Fresh water containing 100 to 500 p.p.m. salt is taken from near the top of the pipe at the rate of 10,000 gallons per hour. The propane gas is taken from the top of the pipe and compressed to a pressure of 75 p.s.i.g. The compressed propane gas is piped back to the bottom of the purification pipe and during transit is condensed by heat exchange with the surrounding cool sea water.

As other hydrate-forming materials which can be used either alone or in combination with each other or with hydrocarbons to practice this invention there can be included carbon dioxide, sulfur dioxide, chlorine, hydrogen sulfide, Freon-12, chloroform, and methylene chloride. Carbon dioxide forms a hydrate at 40° F. and 310 p.s.i.a. or at 48° F. and 550 p.s.i.a. Freon-12 forms a hydrate at 45° F. and 43 p.s.i.a. Hydrogen sulfide forms a hydrate at 80° F. and 250 p.s.i.a. or at 70° F. and 150 p.s.i.a.

In addition to these, nitrogen and air can be used in admixture with the hydrocarbons mentioned hereinabove to practice this invention. Thus, it has been found that a hydrate containing 30 mol percent nitrogen and 70 mol percent propane (water-free basis) is formed from a mixture of these two hydrate forming materials at 33° F. and 450 p.s.i.a. Similarly, at 150 p.s.i.a. and 34° F., a hydrate containing 15 mol percent nitrogen and 85 mol percent propane is formed.

The liquid phase injection of the hydrate-forming material is a preferred form of the invention since heat of condensation has been removed prior to the step of hydrate formation in the purification pipe.

Reasonable variation and modification are possible within the scope of the foregoing disclosure, drawing, and the appended claims to the invention, the essence of which is that there have been provided a method and apparatus for forming hydrates at a locus in sea water at which temperature and pressure conditions are such that hydrate formation is favored, and that said hydrates have been then decomposed by allowing the same, due to their lower density than sea water, to float toward the surface and to decompose, yielding desalted water which is recovered substantially as set forth and described herein.

I claim:

1. A method for desalting water which comprises pumping a hydrate-forming material into salt water under conditions favoring hydrate formation, allowing thus-formed hydrate to float upwardly in a confined zone of said salt water to a place at which conditions favor decomposition of said hydrate forming desalted water and recovering said desalted water from said place.

2. A method according to claim 1 wherein said material is a mixture comprising nitrogen, air and a hydrocarbon.

3. A method according to claim 1 wherein said material is a hydrocarbon.

4. A method for desalting water which comprises pumping a material which forms hydrates with water into salt water under conditions favoring hydrate formation at a substantial distance below the surface of the salt water, allowing thus-formed hydrate to float upwardly in a confined zone of said salt water toward a place at which conditions favor decomposition of said hydrate to form desalted water, washing upwardly floating hydrate before it has decomposed with water, then allowing the hydrate to continue to float upwardly and to decompose to form desalted water and recovering said desalted water from said place.

5. A method according to claim 4 wherein said material is a hydrocarbon.

6. A method for desalting water which comprises pumping a hydrate-forming material to a depth in salt water at which conditions favoring hydrate formation exist, thus forming hydrate, conducting hydrate thus formed in a confined zone upwardly toward the surface of the salt water, washing hydrate thus formed with salt water while conducting the same, as stated, permitting the hydrate thus formed, washed and conducted, time to decompose to form desalted water, recovering the desalted water, recovering hydrate-forming material released from its hydrate, and recycling the same for further use in formation of additional hydrate.

7. A method according to claim 6 wherein said material is a hydrocarbon.

8. A method for desalting water which comprises pumping a hydrate-forming material into salt water in the bottom of an elongated hydrate-forming zone which is under conditions favoring hydrate formation, allowing thus-formed hydrate to float upwardly through a confined washing zone to a confined zone in which conditions favor decomposition of said hydrate forming desalted water and hydrate-forming material, and recovering desalted water from said last confined zone.

9. A method according to claim 8 wherein said material is a hydrocarbon.

10. The method of claim 9 in which the hydrocarbon is n-butane.

11. The method of claim 9 in which the hydrocarbon is ethane.

12. The method of claim 9 in which the hydrocarbon is a mixture containing at least two of the hydrocarbons methane, ethane, propane, and n-butane.

13. A method for desalting water which comprises pumping propane into salt water at the bottom of an elongated substantially vertically disposed pipe submerged in sea water and extending from a point substantially at the surface of the sea water to a depth such that the temperature and pressure conditions at said depth favor hydrate formation between a hydrocarbon and water, allowing hydrate thus formed to float upwardly due to its density which is lower than that of water, thus decomposing a hydrate to form desalted water as the hydrate rises away from the place at which conditions favor hydrate formation, recovering propane for reuse as herein described, and also recovering desalted water from an upper portion of said pipe.

References Cited in the file of this patent

UNITED STATES PATENTS

| | | |
|---|---|---|
| 2,754,098 | Heinze | July 10, 1956 |
| 2,904,511 | Donath | Sept. 15, 1959 |

FOREIGN PATENTS

| | | |
|---|---|---|
| 217,766 | Australia | Oct. 16, 1958 |